US012544303B1

(12) United States Patent
Jeong et al.

(10) Patent No.: US 12,544,303 B1
(45) Date of Patent: Feb. 10, 2026

(54) SEXUAL STIMULATION DEVICE

(71) Applicant: Loma Inc., Seoul (KR)

(72) Inventors: Chan-young Jeong, Seoul (KR); Da-mee Yoon, Seoul (KR)

(73) Assignee: Loma Inc., Seoul (KR)

( * ) Notice: Subject to any disclaimer, the term of this patent is extended or adjusted under 35 U.S.C. 154(b) by 0 days.

(21) Appl. No.: 19/252,070

(22) Filed: Jun. 27, 2025

(30) Foreign Application Priority Data

Aug. 8, 2024 (KR) ........................ 10-2024-0105965

(51) Int. Cl.
*A61H 19/00* (2006.01)
*A61H 9/00* (2006.01)
*A61H 23/02* (2006.01)

(52) U.S. Cl.
CPC ........... *A61H 19/34* (2013.01); *A61H 9/0057* (2013.01); *A61H 19/32* (2013.01); *A61H 19/50* (2013.01); *A61H 23/0254* (2013.01); *A61H 2201/0161* (2013.01); *A61H 2201/0192* (2013.01); *A61H 2201/1207* (2013.01); *A61H 2201/1671* (2013.01); *A61H 2201/1695* (2013.01); *A61H 2201/5005* (2013.01)

(58) Field of Classification Search
None
See application file for complete search history.

(56) References Cited

U.S. PATENT DOCUMENTS

| | | | | |
|---|---|---|---|---|
| 12,257,171 | B1 * | 3/2025 | Wu ........................ | A61H 21/00 |
| 2005/0202687 | A1 | 9/2005 | Park et al. | |
| 2010/0010292 | A1 | 1/2010 | Talbot et al. | |
| 2015/0057495 | A1 * | 2/2015 | Wilks ........................ | A61F 6/06 600/38 |
| 2018/0116904 | A1 * | 5/2018 | Lieberman ............. | A61H 19/34 |
| 2018/0243123 | A1 * | 8/2018 | Packham ............... | A61H 19/32 |
| 2023/0346632 | A1 * | 11/2023 | Tindal .................... | A61H 19/32 |

FOREIGN PATENT DOCUMENTS

| | | |
|---|---|---|
| KR | 10-2005-0091393 A | 9/2005 |
| KR | 10-2021-0006688 A | 1/2021 |

OTHER PUBLICATIONS

Korean Office Action issued Sep. 19, 2024 in Korean Patent Application No. 10-2024-0105965.
Korean Patent Decision issued Dec. 27, 2024 in Korean Patent Application No. 10-2024-0105965.

* cited by examiner

*Primary Examiner* — Thaddeus B Cox
(74) *Attorney, Agent, or Firm* — Sughrue Mion, PLLC

(57) ABSTRACT

A sexual stimulation device (100) is provided. The sexual stimulation device (100) may include a main body (10) having a vibration part (13) configured to generate vibrations provided therein; and a rotating body (20) rotatably coupled to the main body (10).

6 Claims, 8 Drawing Sheets

SEXUAL STIMULATION DEVICE

CROSS-REFERENCE TO RELATED APPLICATION

This application claims priority under 35 U.S.C. § 119 to Korean Patent Application No. 10-2024-0105965 filed on Aug. 8, 2024 in the Korean Intellectual Property Office, the entire content of which is incorporated herein by reference.

TECHNICAL FIELD

The disclosure relates to a sexual stimulation device, and more particularly, to a sexual stimulation device that is implemented to be usable by one person and by a man and a woman together, provides a design and storability that can permeate everyday life, is implemented in a form and length optimized for the stimulation of erogenous zones when used together, secures a universal fit for men, provides users with stronger and heavier vibrations, and is configured such that vibration intensities and optimal patterns are designed taking into account operational convenience.

BACKGROUND

In general, existing tools or devices for the sexual stimulation of women have problems in that their forms are explicit and obscene, accessibility to these tools or devices is very low due to socio-cultural repression, guilt, and the like in women's pursuit of sexual stimulation, and they are difficult to carry and store.

In addition, existing tools or devices for the sexual stimulation of women have problems in that they are not equipped with any means to prevent injury to vulnerable body parts and can cause bodily injury if the user uses it too hard to provide strong stimulation since the body contact part of the tool or device directly contacts the body.

The rate of using cock ring products has recently been on the rise among lovers to make up for these problems and limitations, but these cock ring products have issues in that there is a difference in usability depending on the size of the male penis as they are generally made in a single size, it is difficult to secure universality for female users as the area of the vibration part is small, it is impossible to ensure concealability as their forms are explicit and obscene, and they are not hygienic as they do not come with a storage case.

Therefore, in order to overcome these problems and limitations of existing sexual stimulation devices, there is a gradually increasing need in the industry for a new type of sexual stimulation device that is implemented to be usable by one person and by a man and a woman together, provides a design and storability that can permeate everyday life, is implemented in a form and length optimized for the stimulation of erogenous zones when used together, secures a universal fit for men, provides users with stronger and heavier vibrations, and is configured such that vibration intensities and optimal patterns are designed taking into account operational convenience.

SUMMARY

The present disclosure has been devised to solve the above problems, and it is an object of the present disclosure to provide a sexual stimulation device that can satisfy a variety of utilization patterns of users by implementing it to be usable by one person and by a man and a woman together.

In addition, it is an object of the present disclosure to provide a sexual stimulation device that can ensure concealability and improve the convenience and psychological stability of users by departing from the existing explicit and obscene design of existing sexual stimulation devices and providing a design and storability that can permeate everyday life.

Furthermore, it is an object of the present disclosure to provide a sexual stimulation device that can further improve user satisfaction by providing a form and length optimized for the stimulation of erogenous zones when used together.

Moreover, it is an object of the present disclosure to provide a sexual stimulation device that can also improve user satisfaction by securing a universal fit for men through the additional use of a C-ring.

In addition, it is an object of the present disclosure to provide a sexual stimulation device that can also improve user satisfaction by having vibration intensities and optimal patterns designed and provided taking into account operational convenience.

Furthermore, it is an object of the present disclosure to provide a sexual stimulation device that can provide users with stronger and heavier vibrations by using a premium vibration motor and a tungsten steel vibrator to generate vibrations, and can further improve user satisfaction accordingly.

Moreover, it is an object of the present disclosure to provide a sexual stimulation device that can improve the convenience for users who use the product by implementing the product to be waterproof and rechargeable with a C-type cable.

The objects of the present disclosure are not limited to those mentioned above, and other objects that have not been mentioned will be clearly understood by those skilled in the art from the descriptions below.

A sexual stimulation device according to one embodiment of the present disclosure for accomplishing the above objects may include a main body having a vibration part configured to generate vibrations provided therein; and a rotating body rotatably coupled to the main body.

In addition, the sexual stimulation device may be implemented in an unfolded state or a folded state by the rotation of the rotating body relative to the main body.

Furthermore, a protrusion may be formed in at least a partial region of a first surface of the main body, and a body ring may be formed by an opening in at least a partial region of the rotating body.

Moreover, in the unfolded state, the protrusion and the body ring may be disposed apart without superimposing each other.

In addition, in the folded state, the body ring may be disposed to shield the edge of the protrusion.

Furthermore, the sexual stimulation device may further include a C-ring configured for the body ring to engage along an edge thereof in the unfolded state.

Moreover, the sexual stimulation device may further include a case configured to house the main body and the rotating body in the folded state.

In addition, a case body of the case may be provided with a charging terminal for charging the vibration part of the main body.

According to the sexual stimulation device in accordance with one embodiment of the present disclosure, a variety of utilization patterns of users can be satisfied by being implemented to be usable by one person and by a man and a woman together.

In addition, according to the sexual stimulation device in accordance with one embodiment of the present disclosure, concealability can be ensured and the convenience and psychological stability of users can be improved by departing from the existing explicit and obscene design of existing sexual stimulation devices and providing designs and storability that can permeate everyday life.

Furthermore, according to the sexual stimulation device in accordance with one embodiment of the present disclosure, user satisfaction can be further improved by providing the form and length optimized for the stimulation of erogenous zones when used together.

Moreover, according to the sexual stimulation device in accordance with one embodiment of the present disclosure, user satisfaction can also be improved by securing a universal fit for men through the additional use of the C-ring.

In addition, according to the sexual stimulation device in accordance with one embodiment of the present disclosure, user satisfaction can also be improved by having vibration intensities and optimal patterns designed and provided taking into account operational convenience.

Furthermore, according to the sexual stimulation device in accordance with one embodiment of the present disclosure, stronger and heavier vibrations can be provided to users by using the premium vibration motor and the tungsten steel vibrator to generate vibrations, and user satisfaction can be further improved accordingly.

Moreover, according to the sexual stimulation device in accordance with one embodiment of the present disclosure, the convenience for users who use the product can be improved by implementing the product to be waterproof and rechargeable with a C-type cable.

BRIEF DESCRIPTION OF THE DRAWINGS

For a more complete understanding of the drawings, which will be cited in the detailed description of the present disclosure, a brief description of each drawing is provided.

DETAILED DESCRIPTION OF THE PREFERRED EMBODIMENTS

Hereinafter, embodiments according to the present disclosure will be described with reference to the accompanying drawings. It should be noted that in assigning reference symbols to components in each drawing, the same components are given the same symbols as much as possible even if they are shown in different drawings. In addition, if it is determined that specific descriptions of related known components or functions hinder the understanding of the embodiments of the present disclosure in describing the embodiments of the present disclosure, the detailed description thereof will be omitted. Further, the embodiments of the present disclosure will be described below, but the technical idea of the present disclosure is not limited or restricted thereto and can be modified and implemented in various ways by those skilled in the art.

Throughout the specification, when a part is said to be "connected" to another part, this includes not only cases where it is "directly connected" but also cases where it is "indirectly connected" with another element in between. Throughout the specification, when a part is said to "include" a component, this does not mean that other components are excluded but rather that other components may be further included unless otherwise specifically stated. In addition, terms such as first, second, A, B, (a), (b), and the like may be used to describe components of the embodiments of the present disclosure. These terms are merely intended to distinguish the component from other components, and the nature, order, sequence, or the like of the component is not limited by the terms.

Figure 1:
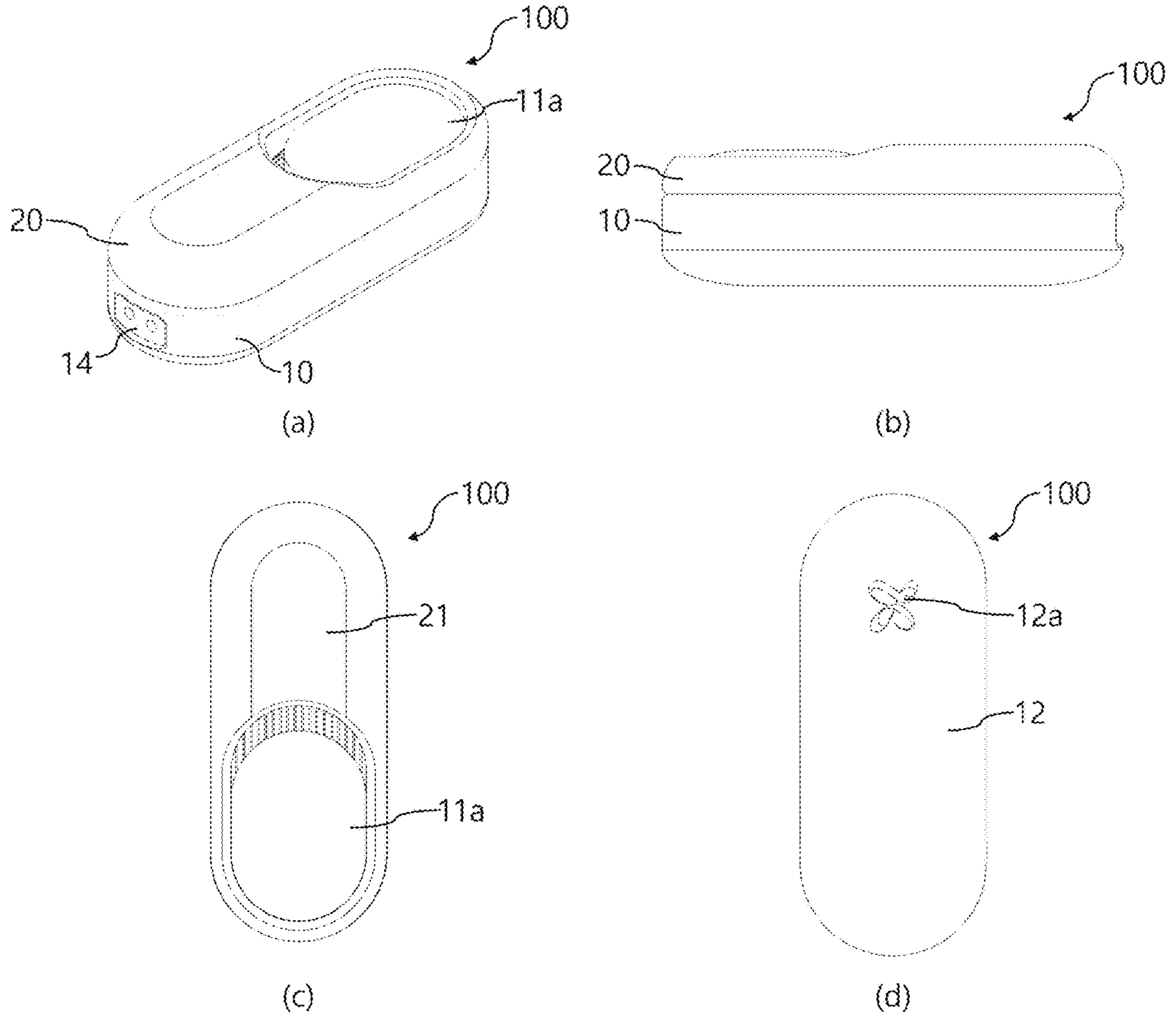
FIG. 1 shows a perspective view, a side view, a plan view, and a rear view, respectively, of a sexual stimulation device 100 in a folded state according to one embodiment of the present disclosure.
Figure 2:
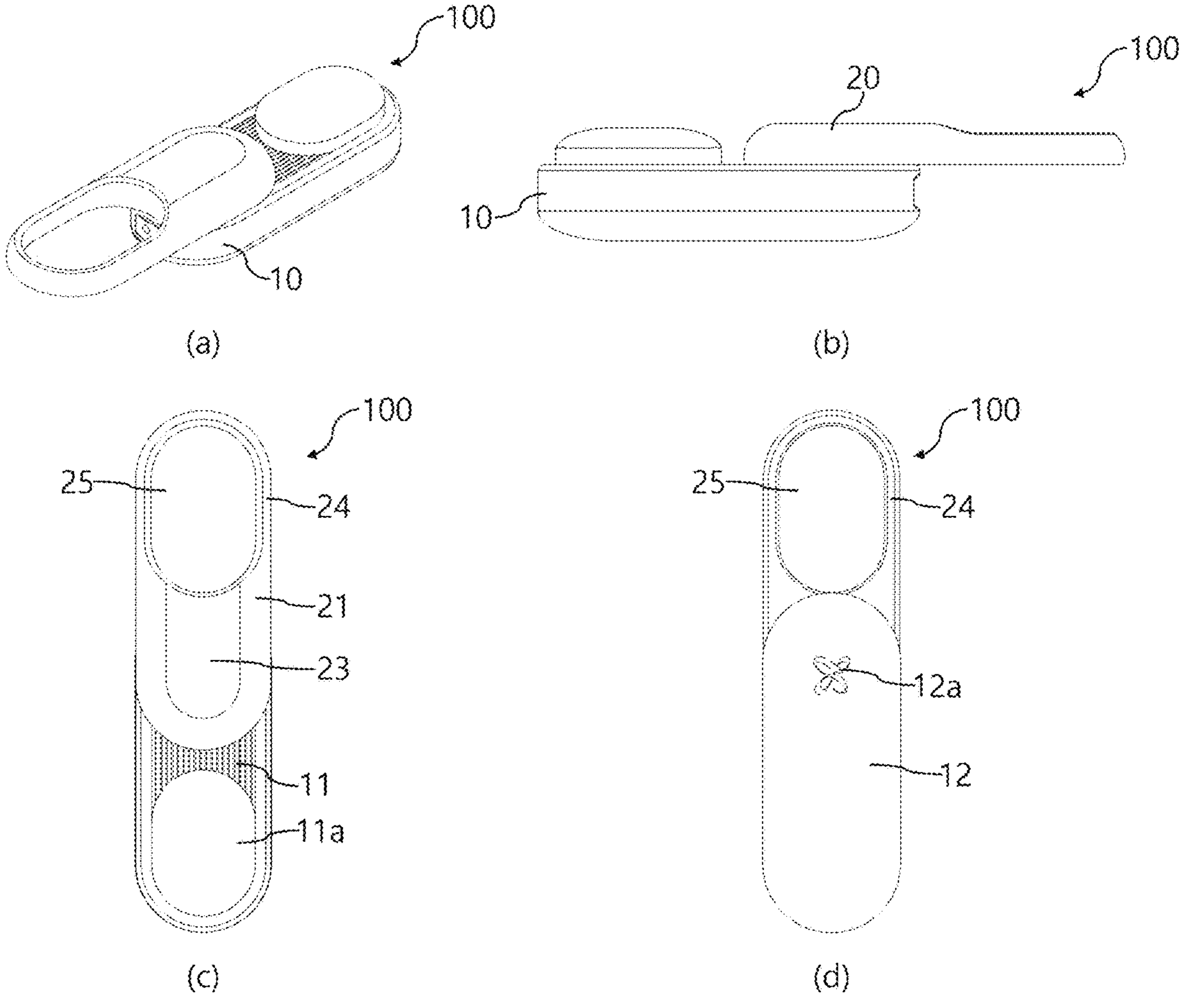
FIG. 2 shows a perspective view, a side view, a plan view, and a rear view, respectively, of the sexual stimulation device 100 in an unfolded state according to one embodiment of the present disclosure.

In order to resolve the drawbacks and problems of existing sexual stimulation devices such as cock rings and the like, a sexual stimulation device 100 according to one embodiment of the present disclosure is characterized by being configured to be usable by one person and by a man and a woman together, providing a design and storability that can permeate everyday life, being implemented in a form and length optimized for the stimulation of erogenous zones when used together, securing a universal fit for men, providing users with stronger and heavier vibrations, and being configured such that vibration intensities and optimal patterns are designed taking into account operational convenience, the sexual stimulation device 100 may be implemented in an unfolded state (i.e., a state in which a rotating body 20 is disposed apart in the opposite direction from a main body 10) or a folded state (i.e., a state in which the rotating body 20 is superimposed on the upper surface of the main body 10) by the rotation of the rotating body 20 relative to the main body 10, and specific components constituting the sexual stimulation device 100 and various states according to the rotation of the rotating body 20 are shown by way of example in FIGS. 1 and 2.

More specifically, FIG. 1 shows a perspective view, a side view, a plan view, and a rear view, respectively, of the sexual stimulation device 100 in the folded state according to one embodiment of the present disclosure, and FIG. 2 shows a perspective view, a side view, a plan view, and a rear view, respectively, of the sexual stimulation device 100 in the unfolded state according to one embodiment of the present disclosure.

As shown, the sexual stimulation device 100 according to one embodiment of the present disclosure may consist of the main body 10 located on the lower side and configured to have a fixed form, and the rotating body 20 located on the upper side, having a variable form, and implemented in a smaller thickness compared to the main body 10.

For reference, the upper and lower parts of the sexual stimulation device 100 are merely used as relative concepts, and the following specification will be described in a configuration in which the main body 10 is disposed below and the rotating body 20 is disposed above the main body 10 for convenience of description but it is also possible to be described in a configuration in which the main body 10 is disposed in the upper part of the device and the rotating body 20 is disposed in the lower part of the device according to various examples of representation of the present disclosure.

The main body 10 may define the basic body of the sexual stimulation device 100 according to the present disclosure. More specifically, as shown, the main body 10 may be provided in the shape of a substantially rectangular parallelepiped having a predetermined length, width, and height, but may be configured such that both ends in the longitudinal direction are provided in a semicircular shape so that the longitudinal cross-section has the shape of a stadium track, and the bottom surface is provided in a slightly convex curved shape, thereby further improving the aesthetics of the product.

In addition, a protrusion 11*a* may be formed on a first surface 11 of the main body 10, and shaft coupling with the rotating body 20 may be implemented in another region of the first surface 11 where the protrusion 11*a* is not formed, thereby implementing rotatable coupling of the rotating body 20 to the main body 10. For reference, the size and height of the protrusion 11*a* may be provided substantially identically or correspondingly to the size and height of a body ring 24 provided on the rotating body 20, which will be described in more detail below.

A second surface 12 of the main body 10 may also be formed on the opposite side of the first surface 11 of the main body 10 where the shaft coupling with the rotating body 20 is implemented, and a mode switching part 12*a* may be implemented in at least a partial region of the second surface 12. The implementation region of the mode switching part 12*a* in the second surface 12 may be set to substantially correspond to the region of a rotation shaft in the opposing first surface 11, the second surface 12 may be provided in the same area as and in parallel to the first surface 11, and on/off of the device, switching of vacuum stages, switching of pattern types, and the like may be achieved via the mode switching part 12*a* that may be implemented as a button or the like in a partial region of the second surface 12.

More specifically, as will be described below, a vibration part 13 according to one embodiment of the present disclosure is characterized by being configured to provide a plurality of stages of vibration (e.g., three stages of vibration, etc.) and a plurality of types of patterns (e.g., two types of patterns), and mode switching for the plurality of stages of vibration and the plurality of types of patterns may be implemented by the mode switching part 12*a* provided on the second surface 12 of the main body 10. For example, switching the operation modes may be implemented by a user pressing the mode switching part 12*a* implemented as a button.

More specifically, the sexual stimulation device 100 may be turned on when the user presses and holds the mode switching part 12*a* for about 2 to 3 seconds, the modes may be switched in sequence each time the mode switching part 12*a* is pressed in that state (e.g., stage 1 vibration (e.g., soft vibration)→stage 2 vibration (e.g., medium vibration) →stage 3 vibration (e.g., strong vibration)→type 1 pattern (e.g., soft and short pattern)→type 2 pattern (e.g., strong and long pattern)) (for reference, the mode sequence for the plurality of vibrations and the plurality of patterns according to the execution of the mode switching part 12*a* may be implemented differently depending on the user settings), and the sexual stimulation device 100 may be turned off when the user presses and holds the mode switching part 12*a* for about 2 to 3 seconds again.

In this regard, although not clearly shown in the drawings, a predetermined display unit may be further provided in at least a partial region of the second surface 12 of the main body 10, more preferably in a region adjacent to the mode switching part 12*a*, and the current operating mode executed by the mode switching part 12*a* may be displayed via this display unit.

For example, a symbol such as "V1" may be displayed via the display unit if the user has selected the mode as the vibration stage 1, a symbol such as "P2" may be displayed via the display unit if the user has similarly selected the mode as the second type of pattern, and no symbol may be displayed via the display unit if the power of the sexual stimulation device 100 is turned off, thereby further improving the intuitive recognition of the user for the current mode in which the sexual stimulation device 100 is operating.

In addition to and/or alternatively to the visual display of the current mode, according to another embodiment of the present disclosure, auditory information on the current operating mode of the sexual stimulation device 100 (e.g., audio information such as "vibration 1," "vibration 2," "vibration 3," "pattern 1," and "pattern 2") may be provided to the user.

Figure 3:
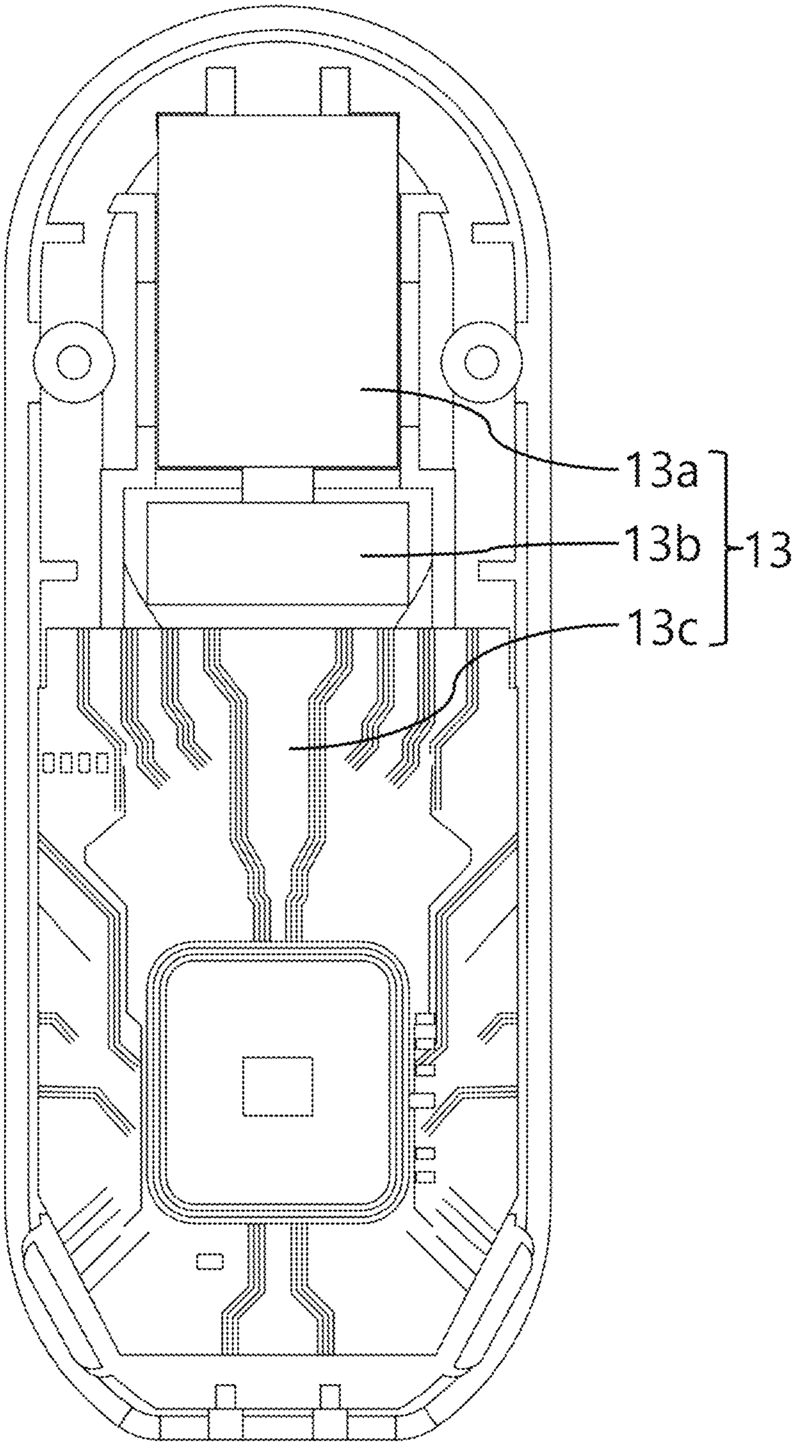
FIG. 3 is an example diagram for describing the configuration of a vibration part 13 according to one embodiment of the present disclosure.

The vibration part 13 configured to generate the plurality of stages of vibration and the plurality of types of patterns in this way may be provided in the internal space of the main body 10, and the configuration of such a vibration part 13 is shown by way of example in FIG. 3. That is, FIG. 3 is an example diagram for describing the configuration of the vibration part 13 according to one embodiment of the present disclosure.

As shown, the vibration part 13, which is provided in the internal space of the main body 10 according to the present disclosure and configured to generate vibrations, may consist of a motor 13*a*, a vibrator 13*b*, PCB 13*c*, etc. The sexual stimulation device 100 according to the present disclosure may be implemented to undergo special waterproof treatment (e.g., designed with an IPX7 waterproof rating), and accordingly, damage or failure to the vibration part 13 including electric (electronic) circuits such as the PCB 13*c* can be effectively prevented even when the sexual stimulation device 100 according to the present disclosure is used during a shower or in a bathtub.

For reference, although not clearly shown in the drawings, the vibration part 13 may further include a charging element such as a battery, where the battery may be provided as a rechargeable battery configured to be rechargeable with a commercial power source (e.g., 220 volts, etc.) via a charging terminal 41*d* (see FIG. 8 below) and charging electrodes 14 and 41*c* (see FIG. 7 below) of a case 40 to be described later.

The motor 13*a* is provided on one side of the internal space of the main body 10 and is supplied with predetermined electric power necessary for the operation of the device from the battery (not shown), but is characterized by being implemented as a premium motor that can provide up to 30% higher output compared to a steel motor of the same or similar specifications.

The vibrator 13*b* may be coupled to the motor 13*a* and configured to generate predetermined vibrations. Unlike the vibrator for generating vibrations in typical sexual stimulation devices being made of a material such as copper or iron, the vibrator 13*b* of the vibration part 13 according to one embodiment of the present disclosure is characterized by being made of a material of tungsten steel, and can thus improve the satisfaction of users who use the sexual stimulation device 100 by generating heavier and stronger vibrations while at the same time enhancing the durability of the product.

The PCB (printed circuit board) 13*c* may be provided in a board type on one side of the motor 13*a* and the vibrator 13*b*, and may be configured to control the movement and operation of the motor 13*a*, vibrator 13*b*, etc., in response to an on/off or mode switching input to the sexual stimulation device 100 via the mode switching part 12*a*. As one example, the PCB 13*c* may be configured to globally control the operation of the sexual stimulation device 100 according to the present disclosure by controlling the on/off, mode switching, etc., of the device according to the execution of the mode switching part 12*a*, and may also be configured to monitor the remaining power of the battery and provide a notification (e.g., a visual notification and/or an auditory notification) to the user when the remaining power falls below a predetermined preset threshold.

Returning to FIGS. 1 and 2, the main body 10 according to one embodiment of the present disclosure may further include charging electrodes 14 in a partial region of its outer surface. The charging electrodes 14 provided on the main body 10 may be coupled (i.e., electrically connected) to the charging electrodes 41*c* provided on the inside of the case 40 as the coupled body of the main body 10 and the rotating body 20 is housed in the case 40, and accordingly, the battery embedded in the vibration part 13 of the main body 10 can be electrically charged with a commercial power source via the charging terminal 41*d*.

The rotating body 20 may be rotatably coupled to the main body 10. More specifically, the rotating body 20 may be coupled to the main body 10 so as to be rotatable clockwise and/or counterclockwise around the rotation shaft formed about a partial region of a shaft center part 23, and the state of the sexual stimulation device 100 may be implemented in the folded state (e.g., in the case of FIG. 1) or the unfolded state (e.g., in the case of FIG. 2) by the rotation of the rotating body 20 relative to the main body 10.

In addition, the rotating body 20 may be provided in the shape of a substantially rectangular parallelepiped having a predetermined length, width, and height, and may be configured such that both ends in the longitudinal direction are provided in a semicircular shape so that the longitudinal cross-section has the shape of a stadium track as with the main body 10, but the rotating body 20 may be formed at a smaller height compared to the height of the main body 10 and is different from the main body 10 that does not have an opening in that an opening 25 is formed in at least a partial region thereof.

The rotating body 20 may consist of a third surface 21 exposed to the outside, for example, upward, and a fourth surface 22 in contact with the main body 10, more specifically, the first surface 11 of the main body 10, and may be partitioned in the longitudinal direction into the shaft center part 23 and the body ring 24.

The rotation shaft that enables the rotatable coupling of the rotating body 20 to the main body 10 may be formed in at least a partial region of the shaft center part 23, and accordingly, the user can utilize the sexual stimulation device 100 according to the present disclosure in various uses and configurations in a variety of states (e.g., a folded state, an unfolded state, a half-folded state, etc.) as the user rotates the rotating body 20 according to various usage examples or purposes.

Furthermore, the body ring 24 may also be provided by having the opening 25 of a predetermined size formed in one region of the rotating body 20, where the shape of the opening 25 (and thus the shape of the body ring 24) may be implemented to be substantially the same as the shape of the protrusion 11*a* formed on the first surface 11 of the main body 10, and accordingly, the body ring 24 may be disposed to shield the edge of the protrusion 11*a* in the folded state (e.g., see the configuration of FIG. 1), and the protrusion 11*a* and the body ring 24 may be disposed apart without superimposing each other in the unfolded state (e.g., see FIG. 2). A usage example of the sexual stimulation device 100 in the folded or unfolded state assumed by the coupled body of the main body 10 and the rotating body 20 will be described in more detail through FIGS. 4 and 6 below.

Here, as clearly shown in the drawings too, the body ring 24 engages the edge of the protrusion 11*a* (i.e., the folded state of FIG. 1) or the body ring 24 is disposed apart from the protrusion 11*a* (i.e., the unfolded state of FIG. 2) depending on the rotation of the rotating body 20, the thickness of the body ring 24 may be implemented to be thinner than the thickness of the shaft center part 23 and the thickness of the body ring 24 may also be implemented to be substantially equal to the height of the protrusion 11*a* in order to further improve the morphological stability during such relative movement, rotation, and engagement of the body ring 24 with respect to the protrusion 11*a*, a predetermined inclined region may thus be formed along the way from the shaft center part 23 to the body ring 24 of the rotating body 20 (e.g., see (b) of FIG. 2), and a height adjustment part 41*b* (see FIG. 7 below) for adjusting the height when the coupled body of the main body 10 and the rotating body 20 in the folded state is housed in the case 40 may be formed on at least a partial region of the bottom surface of a case body 41.

The coupled body may be provided in a size of about 65 mm in length, about 27 mm in width, and about 18 mm in height when the main body 10 and the rotating body 20 are in the folded state as shown in FIG. 1, the coupled body may be provided in a size of about 100 mm in length, about 27 mm in width, and about 18 mm in height when the main body 10 and the rotating body 20 are in the unfolded state as shown in FIG. 2, and both portability and mobility of the product can be improved by having the sexual stimulation device 100 implemented in such a relatively small size that can be easily held in one hand. However, these sizes and numerical values are merely examples for easy understanding of the present disclosure, and it will be apparent that the main body 10 and the rotating body 20 of the sexual stimulation device 100 according to the present disclosure can be implemented in various sizes and numerical values.

For reference, the main body 10 and the rotating body 20 according to the present disclosure may be made of silicone or the like, which is harmless to the human body, considering that they are used in direct contact with the body parts of users.

Figure 4:
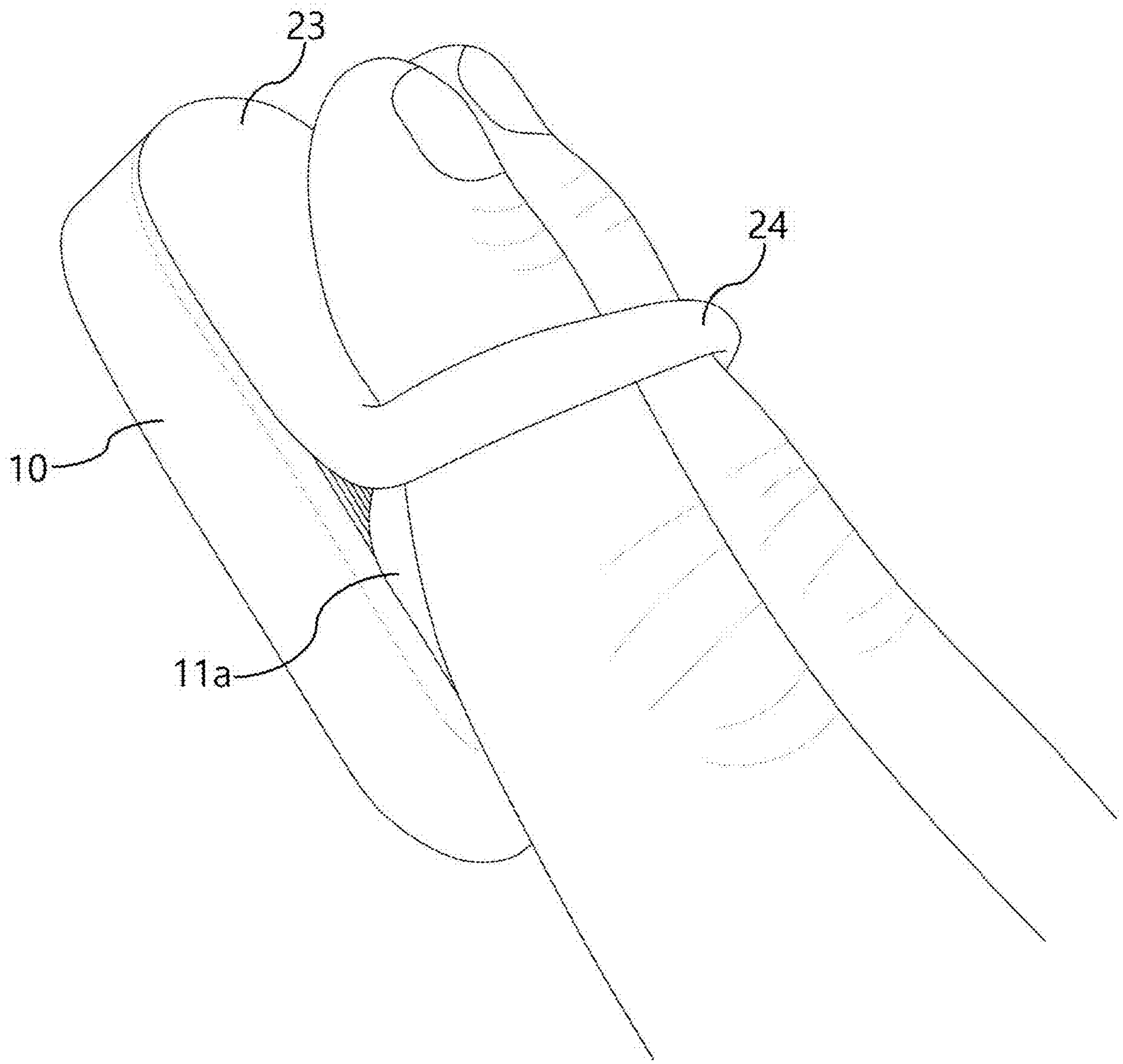
FIG. 4 is a usage state diagram for describing a usage example of the sexual stimulation device 100 according to one embodiment of the present disclosure.

FIG. 4 is a usage state diagram for describing a usage example of the sexual stimulation device 100 according to one embodiment of the present disclosure.

As described above, the sexual stimulation device 100 according to one embodiment of the present disclosure may be implemented in the unfolded state or folded state by the rotation of the rotating body 20 relative to the main body 10, and the coupled body of the main body 10 and the rotating body 20 may be implemented in the folded state when the rotating body 20 is disposed on the upper surface of the main body 10 (i.e., when they are superimposed in parallel one above the other).

In this folded state, the user can engage the sexual stimulation device 100 with fingers by inserting the fingers through the body ring 24 and bringing them into contact with the upper surface of the shaft center part 23 as shown by way of example in FIG. 4, a particular vibration and/or pattern of the sexual stimulation device 100 can be activated through the execution of the mode switching part 12*a*, and then the second surface 12 of the main body 10 can be brought into contact with a female erogenous zone (e.g., clitoris, nipples, etc.), thereby stimulating the erogenous zone by the vibration and/or pattern. Accordingly, users are allowed to enjoy a more sensual foreplay stage with the vibrations and/or patterns provided by the sexual stimulation device 100 according to the present disclosure, and more subtle and heavier stimulation can be provided to male and female users, respectively.

For reference, FIG. 4 shows by way of example a case where the main body 10 and the rotating body 20 are used alone in the folded state, but according to a further embodiment of the present disclosure, the protrusion 11*a* provided on the first surface 11 of the main body 10 is placed on the opposite side of the fingers while the main body 10 and the rotating body 20 are in the unfolded state and the fingers are brought into contact with the second surface 12 of the main body 10 through the body ring 24, the protrusion 11*a* with a smaller area compared to the second surface 12 of the main body 10 is brought into contact with a female erogenous zone in that state, and thus, the sexual stimulation device 100 according to the present disclosure may be utilized to stimulate the female erogenous zone more finely and precisely.

The usage example of the sexual stimulation device 100 shown in FIG. 4 is an example of using it by one person, and according to another embodiment of the present disclosure, the sexual stimulation device 100 may be used by a man and a woman together, and the sexual stimulation device 100 in this case may be implemented in an unfolded state in which the rotating body 20 is rotatably coupled to the main body 10 and the body ring 24 is disposed apart from the main body 10 without being superimposed thereon.

As the second surface 12 of the main body 10 comes into contact with the female erogenous zone when a man and a woman have sexual intercourse in a state where the male penis is inserted into the body ring 24 disposed protruding outward from the sexual stimulation device 100 in the unfolded state, the vibration and/or pattern generated by the vibration part 13 can be transmitted, thereby continuously stimulating the female erogenous zone.

Figure 5:
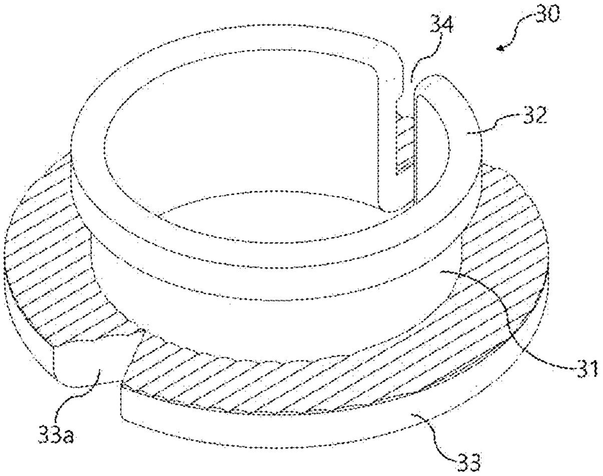
FIG. 5 shows a perspective view and a plan view, respectively, of a C-ring 30 according to one embodiment of the present disclosure.
Figure 5:
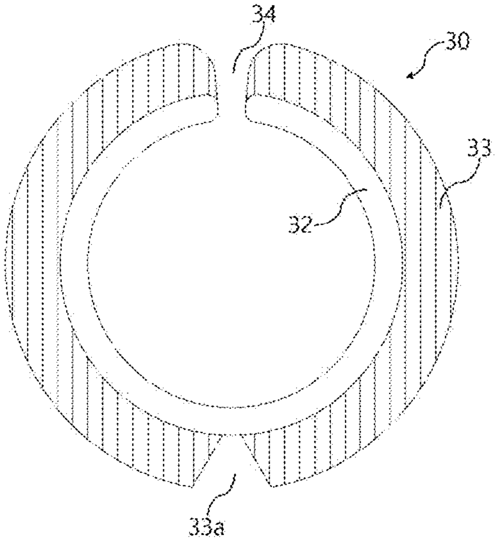

However, there are limitations or problems that make it difficult to ensure a universal fit for men with the use of the body ring 24 alone (e.g., there is a problem that the body ring 24 is too loose or tight depending on the size of the male penis), and in order to solve these limitations or problems, the sexual stimulation device 100 according to the present disclosure may further include a C-ring 30 configured for the body ring 24 to engage along its edge region. A perspective view and a plan view of the C-ring 30 according to one embodiment of the present disclosure are shown by way of example in FIG. 5.

As shown, the C-ring 30 according to one embodiment of the present disclosure may consist of a circular ring body 31 and an upper protrusion rim 32 and a lower protrusion rim 33 formed in protrusion, respectively, at both ends of the ring body 31 in the circumferential direction. The protruding length of the lower protrusion rim 33 from the ring body 31 may be implemented to be longer than the protruding length of the upper protrusion rim 32 from the ring body 31, and a cutout part 33*a* may be further formed in at least a partial region of the lower protrusion rim 33, more preferably in a region opposite an open part 34.

Figure 6:
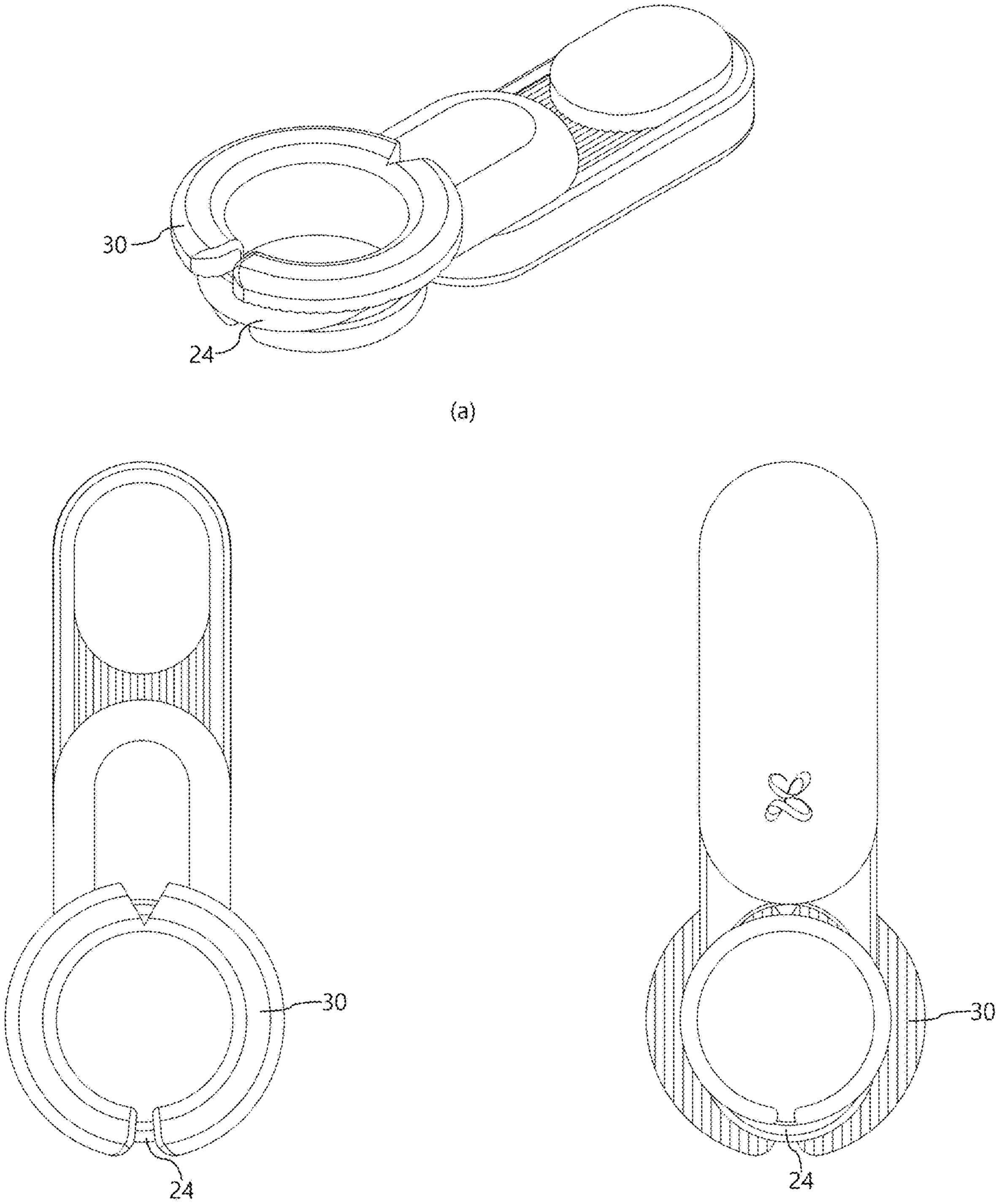
FIG. 6 is an example diagram for describing a usage example of the sexual stimulation device 100 according to one embodiment of the present disclosure.

Another usage example of the sexual stimulation device 100 according to one embodiment of the present disclosure utilizing such a C-ring 30 is shown by way of example in FIG. 6. As shown, the body ring 24 disposed apart outward when the coupled body of the main body 10 and the rotating body 20 is in the unfolded state may engage along the edge of the ring body 31 of the C-ring 30, and accordingly, the insertion of a male penis of a variety of sizes is made possible, thereby ensuring a universal fit for men.

Here, the direction of engagement of the body ring 24 with the C-ring 30 can be implemented both forward and backward, but as shown in FIG. 6, the engagement of the C-ring 30 and the body ring 24 may be implemented so that the lower protrusion rim 33 faces the first surface 11 of the main body 10 and the upper protrusion rim 32 faces the second surface 12 of the main body 10, thereby creating a more structurally stable engagement.

Here, the open part 34 formed in the C-ring 30 and the cutout part 33*a* formed in a partial region of the lower protrusion rim 33 to fit various sizes of male penises inserted into the body ring 24, and the elastic properties of the body ring 24 and the C-ring 30 can variably adjust the size of the ring body 31, and thus, the universal fit for men using the body ring 24 engaged with the C-ring 30 can be further enhanced.

That is, by causing the second surface 12 of the main body 10 to come into contact with the female erogenous zones when the C-ring 30 is engaged with the body ring 24 disposed protruding outward from the sexual stimulation device 100 in the unfolded state, the male penis is then inserted, and a man and a woman have sexual intercourse, the vibrations and/or patterns generated by the vibration part 13 can be made to be transmitted, thereby continuously stimulating the female erogenous zones.

To this end, the sexual stimulation device 100 according to the present disclosure can be implemented in a form and length optimized for the stimulation of female erogenous zones when used by a man and a woman together by inserting the male penis into the body ring 24, and the length of the sexual stimulation device 100 according to the present disclosure can be formed to be about 150% longer (or more sufficiently) compared to, for example, the length of typical sexual stimulation devices that are difficult to ensure universality due to their short body length, thereby securing universality for women with various body sizes as well.

Therefore, there was the inconvenience of having to utilize one's hands to stimulate female erogenous zones in the past, but when using the sexual stimulation device 100 according to the present disclosure, there is an advantage in that the stimulation of the female erogenous zones can be implemented hands-free, i.e., without the need to use one's hands, through the vibrations and/or patterns provided by the sexual stimulation device 100 during sexual intercourse.

Furthermore, the vibration part 13 according to the present disclosure is configured to provide vibrations of different intensities (or strengths) in three stages and two different patterns as described, and can thus provide a unique and diverse sexual experiences to female users. The vibration part 13 according to the present disclosure is configured to provide a vibration intensity and an optimal pattern by taking into account operational convenience, a plurality of different patterns, in particular, is implemented such that the intensity (or strength) of the vibration and the length of the vibration are different, and accordingly, by allowing one of the plurality of different vibration patterns to be selected, the needs of users who desire diverse experiences and sexual satisfaction can be fully satisfied.

For reference, it has been found through a variety of experiments, research, investigations, etc., that vibrations with a predetermined pattern are more effective in stimulating the female erogenous zones compared to simple vibrations, and through such experiments or the like, the present inventors have endeavored to meet the diverse needs of male and female users by further implementing patterns having different intensities and lengths (e.g., two types) in addition to the vibrations having a difference in intensity/strength (e.g., three stages) via the vibration part 13.

Here, when the body ring 24 is worn on the male penis or the C-ring 30 having the body ring 24 engaged with its edge is worn, the blood flow to the penis is restricted, thereby improving the penile hardness and also increasing the duration of the sexual intercourse, and accordingly, the sexual satisfaction of users who use the sexual stimulation device 100 according to the present disclosure can also be improved.

The sexual stimulation device 100 according to the present disclosure may be configured to be used by a man and a woman (couples, lovers, spouses, etc.) together as shown by way of example in FIG. 6, the sexual stimulation device 100 according to the present disclosure may also be configured to be used by one person as shown by way of example in FIG. 4, and accordingly, there is an advantage of being able to satisfy all of the needs of users for various usage aspects for the sexual stimulation device 100 according to the present disclosure.

Figure 7:
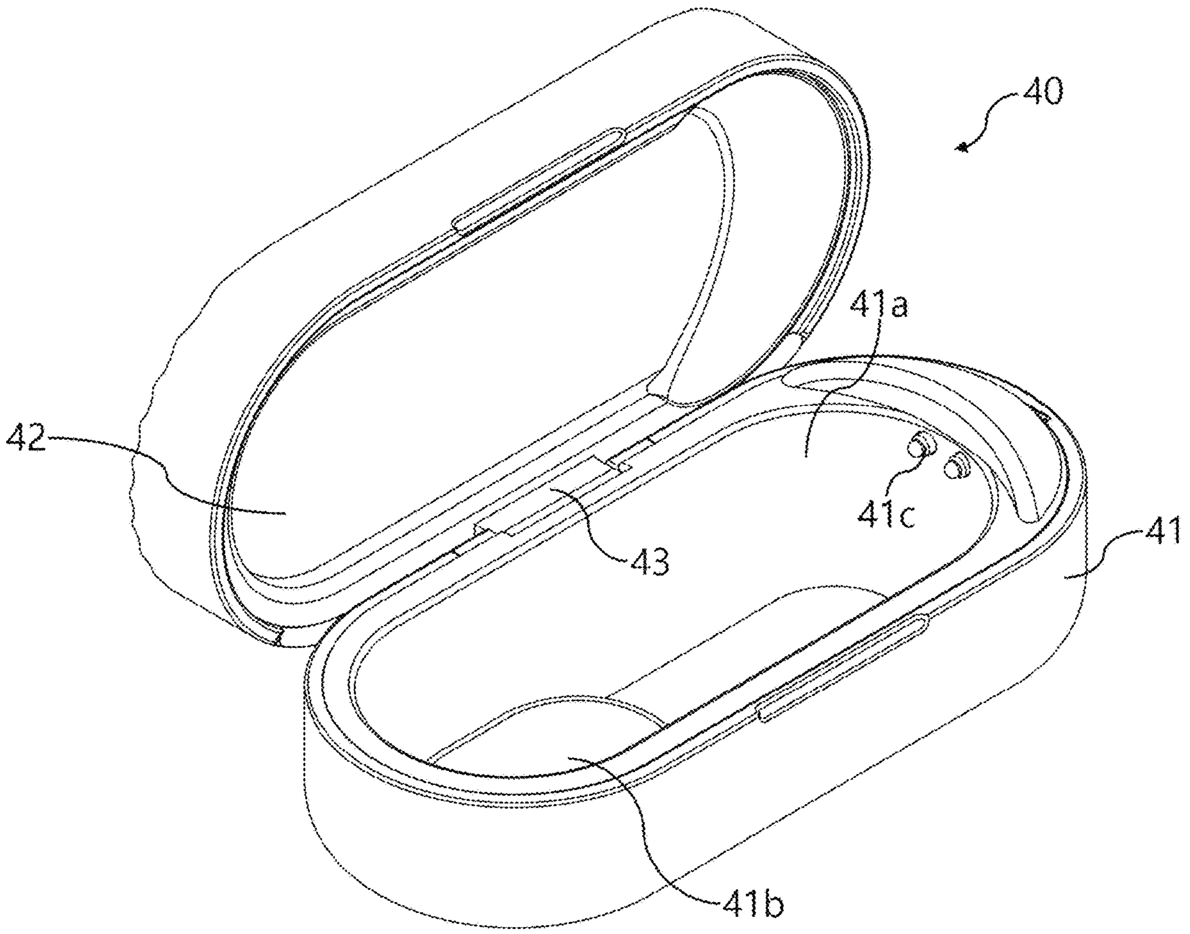
FIGS. 7 and 8 show an open configuration and a closed configuration of a case 40 according to one embodiment of the present disclosure, respectively.
Figure 8:
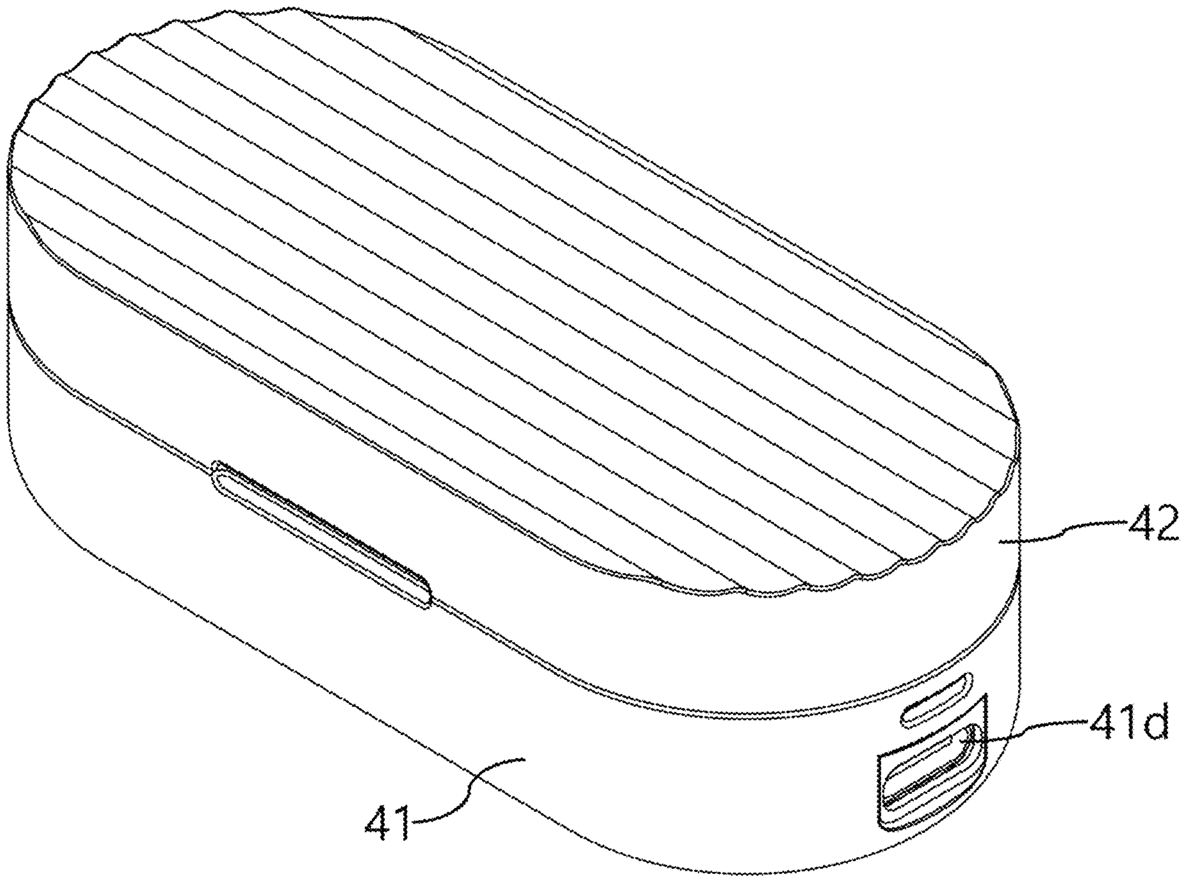

The sexual stimulation device 100 operating with such a configuration needs to be stored more hygienically after use, the sexual stimulation device 100 according to a further embodiment of the present disclosure may further include a case 40 for housing the main body 10 and the rotating body 20, more particularly, configured to house the coupled body of the main body 10 and the rotating body 20 in the folded state for this purpose, and an open configuration and a closed configuration of such a case 40 are shown in FIGS. 7 and 8, respectively.

As shown, the case 40 according to the present disclosure may consist of a case body 41 configured to house the coupled body of the main body 10 and the rotating body 20, a case lid 42 for covering the case body 41 and implementing its opening and closing, a hinge 43 for implementing the coupling of the case body 41 and the case lid 42, etc.

For reference, the case 40 may be made of a plastic material, for example, an ABS resin (acrylonitrile butadiene styrene copolymer), which, however, is merely one example of the material of the case 40, and it will be apparent that it may also be made of other materials.

The case body 41 may be provided with a receiving cavity 41*a* and configured to house the coupled body of the main body 10 and the rotating body 20 (i.e., the coupled body of the main body 10 and the rotating body 20 in the folded state) therein. The size and shape of the receiving cavity 41*a* may be implemented to be the same or substantially the same as the size and shape of the coupled body of the main body 10 and the rotating body 20.

In addition, a height adjustment part 41*b* may be formed on at least a partial region of the bottom surface of the case body 41. As described above, the thickness of the body ring 24 may be implemented to be thinner than the thickness of the shaft center part 23 and the thickness of the body ring 24 may also be implemented to be substantially equal to the height of the protrusion 11*a*, a predetermined inclined region may thus be formed along the way from the shaft center part 23 to the body ring 24 of the rotating body 20, and the height adjustment part 41*b* for adjusting the height when the coupled body in the folded state is housed in the case body 40 may be formed on the bottom surface of the case body 41.

Moreover, charging electrodes 41*c* may be further formed in at least a partial region of the case body 41, these charging electrodes 41*c* may be positioned to be in electrical contact (or connection) with the charging electrodes 14 provided on the main body 10 when the coupled body of the main body 10 and the rotating body 20 is housed in the case body 41, the protrusion 11*a* formed on the first surface 11 of the main body 10 may thus naturally come into contact with the height adjustment part 41*b* on the bottom surface of the case body 41 when the user directs the second surface 12 of the main body 10 to face the sky and the charging electrodes 14 to face upward, i.e., to be connected to the charging electrodes 41*c* of the case body 41, and accordingly, the height balance of the coupled body of the main body 10 and the rotating body 20 being inserted can be adjusted.

Furthermore, a charging terminal 41*d* may be provided on the outside of the case body 41 as shown in FIG. 8, and through this, the convenience for the user can be further improved by allowing the sexual stimulation device 100 according to the present disclosure, more specifically, the battery (not shown) provided in the vibration part 13 to be charged utilizing a commercial power source based on a C-type.

The case lid 42 may be coupled to one side of the case body 41 and configured to cover the case body 41 and implement its opening and closing. As shown, the case lid 42 may be implemented in a smaller thickness compared to the case body 41, and the shape, color, and cross-sectional size may be implemented to be identical thereto for product integrity and uniformity. The case lid 42 may be coupled to the case body 41 via a predetermined coupling means, and for example, the coupling means may include a hinge 43 or the like.

As can be seen from the sexual stimulation device 100 in the folded state shown in FIG. 1, the case 40 shown in FIGS. 7 and 8, and the like, the sexual stimulation device 100 according to one embodiment of the present disclosure has an external design like an electronic device such as a Bluetooth earphone or the like, can thus provide users with a design and storability that can permeate everyday life, and can further enhance the concealability characteristic of the sexual stimulation device 100, in particular, through the rotation of the rotating body 20 relative to the main body 10.

In addition, the sexual stimulation device 100 according to the present disclosure is implemented to be waterproof, for example, designed with an IPX7 waterproof rating, and has the advantage of being usable during a shower or in a bathtub.

As described above, according to the sexual stimulation device in accordance with one embodiment of the present disclosure, a variety of utilization patterns of users can be satisfied by being implemented to be usable by one person and by a man and a woman together.

In addition, according to the sexual stimulation device in accordance with one embodiment of the present disclosure, concealability can be ensured and the convenience and psychological stability of users can be improved by departing from the existing explicit and obscene design of existing sexual stimulation devices and providing designs and storability that can permeate everyday life.

Furthermore, according to the sexual stimulation device in accordance with one embodiment of the present disclosure, user satisfaction can be further improved by providing the form and length optimized for the stimulation of erogenous zones when used together.

Moreover, according to the sexual stimulation device in accordance with one embodiment of the present disclosure, user satisfaction can also be improved by securing a universal fit for men through the additional use of the C-ring.

In addition, according to the sexual stimulation device in accordance with one embodiment of the present disclosure, user satisfaction can also be improved by having vibration intensities and optimal patterns designed and provided taking into account operational convenience.

Furthermore, according to the sexual stimulation device in accordance with one embodiment of the present disclosure, stronger and heavier vibrations can be provided to users by using the premium vibration motor and the tungsten steel vibrator to generate vibrations, and user satisfaction can be further improved accordingly.

Moreover, according to the sexual stimulation device in accordance with one embodiment of the present disclosure, the convenience for users who use the product can be improved by implementing the product to be waterproof and rechargeable with a C-type cable.

DESCRIPTION OF REFERENCE SYMBOLS

100: Sexual stimulation device
10: Main body
11: First surface
11*a*: Protrusion
12: Second surface
12*a*: Mode switching part
13: Vibration part
13*a*: Motor
13*b*: Vibrator
13*c*: PCB
14: Charging electrodes
20: Rotating body
21: Third surface
22: Fourth surface
23: Shaft center part
24: Body ring
25: Opening
30: C-ring
31: Ring body
32: Upper protrusion rim
33: Lower protrusion rim
33*a*: Cutout part
34: Open part
40: Case
41: Case body
41*a*: Receiving cavity
41*b*: Height adjustment part
41*c*: Charging electrodes
41*d*: Charging terminal
42: Case lid
43: Hinge

What is claimed is:

1. A sexual stimulation device (100) comprising:

a main body (10) having a vibration part (13), wherein the vibration part (13) comprises a motor (13*a*), a vibrator (13*b*), a PCB (13*c*) and a battery, and the vibration part (13) is configured to generate vibrations; and a rotating body (20) rotatably coupled to the main body (10), wherein by rotation of the rotating body (20) relative to the main body (10), the sexual stimulation device (100) is implemented in a folded state in which the rotating body (20) is superimposed on an upper surface of the main body (10) to be usable by a woman alone, or in an unfolded state in which the rotating body (20) is disposed apart in an opposite direction from the main body (10) to be usable by a man and a woman together, wherein a body ring (24) is formed by an opening (25) in at least a partial region of the rotating body (20), and a C-ring (30) engages along an edge of the body ring (24) in the unfolded state, wherein the C-ring (30) comprises a ring body (31) with which the body ring (24) engages along the edge, a lower protrusion rim (33) which protrudes in a circumferential direction from one end of the ring body (31) in a circumferential direction and in which a cutout part (33*a*) is formed in a partial region thereof, and an open part (34) formed in a region opposite the cutout part (33*a*), and wherein the vibration part (13) is configured to provide a plurality of stages of vibrations and a plurality of types of patterns, wherein modes of the plurality of stages of vibrations and the plurality of types of patterns are switched by a mode switching part (12*a*) provided on a second surface (12) of the main body (10).

2. The sexual stimulation device (100) of claim 1, wherein a protrusion (11*a*) is formed in at least a partial region of a first surface (11) of the main body (10).

3. The sexual stimulation device (100) of claim 2, wherein in the unfolded state, the protrusion (11*a*) and the body ring (24) are disposed apart without superimposing each other.

4. The sexual stimulation device (100) of claim 2, wherein in the folded state, the body ring (24) is disposed to shield an edge of the protrusion (11*a*).

5. The sexual stimulation device (100) of claim 1, further comprising:

a case (40) configured to house the main body (10) and the rotating body (20) in the folded state.

6. The sexual stimulation device (100) of claim 5, wherein a case body (41) of the case (40) is provided with a charging terminal (41*d*) for charging the vibration part (13) of the main body (10).

* * * * *